United States Patent
Uchida et al.

(10) Patent No.: US 11,089,514 B2
(45) Date of Patent: Aug. 10, 2021

(54) SCEF ENTITY, CONTROL NODE, COMMUNICATION METHOD, AND NON-TRANSITORY COMPUTER READABLE MEDIUM

(71) Applicant: NEC Corporation, Tokyo (JP)

(72) Inventors: Norio Uchida, Tokyo (JP); Naoaki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/347,399

(22) PCT Filed: Nov. 7, 2017

(86) PCT No.: PCT/JP2017/040112
§ 371 (c)(1),
(2) Date: May 3, 2019

(87) PCT Pub. No.: WO2018/084310
PCT Pub. Date: May 11, 2018

(65) Prior Publication Data
US 2019/0306753 A1    Oct. 3, 2019

(30) Foreign Application Priority Data
Nov. 7, 2016 (JP) .............................. JP2016-217046

(51) Int. Cl.
*H04W 28/14*   (2009.01)
*H04W 28/04*   (2009.01)
*H04W 88/14*   (2009.01)

(52) U.S. Cl.
CPC .......... *H04W 28/14* (2013.01); *H04W 28/04* (2013.01); *H04W 88/14* (2013.01)

(58) Field of Classification Search
CPC ...... H04W 28/14; H04W 28/04; H04W 88/14
See application file for complete search history.

(56) References Cited

U.S. PATENT DOCUMENTS

| | | | |
|---|---|---|---|
| 9,948,646 B1 * | 4/2018 | Lai | H04L 63/0884 |
| 2006/0285526 A1 | 12/2006 | Jang et al. | |
| 2018/0206093 A1 * | 7/2018 | Jain | H04W 92/00 |
| 2018/0212710 A1 * | 7/2018 | Ronneke | H04W 88/16 |

(Continued)

OTHER PUBLICATIONS

Decision to Grant a Patent dated Mar. 17, 2020 from the Japanese Patent Office in application No. 2018-549112.

(Continued)

*Primary Examiner* — Mehmood B. Khan
(74) *Attorney, Agent, or Firm* — Sughrue Mion, PLLC

(57) ABSTRACT

An SCEF entity capable of reducing the number of messages between a control node such as an MME and an SCEF is provided. An SCEF entity (10) according to the present invention includes a storage unit (11) that buffers Non-IP data not delivered to a communication terminal (40) through a control node (20), and a control unit (12) that, upon receiving a control message sent from the control node (20) in response to a communication event that has occurred in the communication terminal (40), sends Non-IP data buffered in the storage unit (11) to the control node (20) without waiting for transmission of an indication message from the control node (20), the indication message explicitly indicating that Non-IP data is deliverable to the communication terminal (40).

10 Claims, 13 Drawing Sheets

(56) References Cited

U.S. PATENT DOCUMENTS

| | | | | |
|---|---|---|---|---|
| 2018/0324652 A1* | 11/2018 | Ryu | ............... | H04W 36/12 |
| 2018/0332462 A1* | 11/2018 | Kim | ............... | H04W 28/02 |
| 2018/0368202 A1* | 12/2018 | Landais | ............ | H04W 4/70 |
| 2019/0014530 A1* | 1/2019 | Aghili | ............. | H04W 28/12 |
| 2019/0028337 A1* | 1/2019 | Ryu | ............... | H04W 4/70 |
| 2019/0028866 A1* | 1/2019 | Baek | ............. | H04W 4/70 |
| 2019/0069211 A1* | 2/2019 | Ronneke | ......... | H04W 76/28 |
| 2019/0253875 A1* | 8/2019 | Vittal | .............. | H04W 8/08 |
| 2020/0053802 A1* | 2/2020 | Li | ................. | H04L 41/5077 |

OTHER PUBLICATIONS

NEC, "Corrections for MT NIDD procedure to handle multiple non-IP data", SA WG2 Meeting #S2-117, S2-165759, Oct. 17-21, 2016, Kaohsiung City, Taiwan, 4 pages.

Alcatel-Lucent et al., "Introduction of non-IP data delivery via the SCEF for cellular IoT", 3GPP TSG-SA WG2 Meeting #112, S2-160481, Jan. 25-29, 2016, Frigate Bay, St. Kitts, 17 pages total.

Extended European Search Report dated Jul. 30, 2019 issued by the European Patent Office in counterpart application No. 17867948.6.

3GPP TS 23.682 V14.1.0, 3rd Generation Partnership Project; Technical Specification Group Services and System Aspects; Architecture enhancements to facilitate communications with packet data networks and applications (release 14), Sep. 2016, pp. 1-99.

"EDRX support for NIDD via SCEF", Nokia, Convida Wireless, AT&T, 3GPP TSG-SA2 Meeting #114, S2-161659, Sophia Antipolis, France, Apr. 11-15, 2016, pp. 1-5.

"Corrections for Non-IP Data Delivery Procedures", ZTE, SA WG2 Meeting #116, S2-163818, Vienna, Austria, Jul. 11-15, 2016, pp. 1-9.

"Corrections for MT NIDD procedure to handle multiple non-IP data", NEC, SA WG2 Meeting #S2-117, S2-166009, Kaohsiung City, Taiwan, Oct. 17-21, 2016, pp. 1-4.

"Support for rate control of CIoT Control Plane data", Ericsson, Nokia, AT&T, SA WG2 Meeting #114, S2-161929, Sophia Antipolis, France, Apr. 11-15, 2016, pp. 1-19.

International Search Report for PCT/JP2017/040112 dated Jan. 9, 2018 [PCT/ISA/210].

* cited by examiner

SCEF ENTITY, CONTROL NODE, COMMUNICATION METHOD, AND NON-TRANSITORY COMPUTER READABLE MEDIUM

CROSS REFERENCE TO RELATED APPLICATIONS

This application is a National Stage of International Application No. PCT/JP2017/040112, filed on Nov. 7, 2017, which claims priority from Japanese Patent Application No. 2016-217046, filed on Nov. 7, 2016, the contents of all of which are incorporated herein by reference in their entirety.

TECHNICAL FIELD

The present invention relates to an SCEF (Service Capability Exposure Function) entity, a control node, a communication method and a program, and particularly relates to an SCEF entity, a control node, a communication method and a program for processing Non-IP data.

BACKGROUND ART

Mobile communication technology related to IoT (Internet of Things) that allows various devices (things) to have mobile communication functions to enable connection to the Internet or communication with another device is expanding today. One issue to be addressed when allowing devices to have mobile communication functions is reduction of power consumption. Sensor devices or the like are expected to operate without maintenance over a long period of time, such as several years. Thus, it is desirable to reduce power consumption of communication when allowing such devices to have mobile communication functions.

Non-IP data delivery that performs data communication without using IP protocol stack is defined as one of techniques to reduce power consumption of communication by 3GPP (3rd Generation Partnership Project) that defines the standard for mobile communication.

Non Patent Literature 1 discloses, in Section 5.13.3, a configuration example for carrying out downlink (from network to terminal) Non-IP data delivery in an EPC (Evolved Packet Core) network and a procedure in this configuration example.

This configuration example includes a UE (User Equipment) that receives Non-IP data, an SCS (Services Capability Server) or an AS (Application Server), which is the sender of Non-IP data, an SCEF (Service Capability Exposure Function) that receives Non-IP data and carries out authorization, traffic control and load control, and an MME (Mobility Management Entity) that sends Non-IP data to a UE by using a C (Control)-Plane message (e.g., NAS (Non Access Stratum) message).

CITATION LIST

Non Patent Literature

NPL1: 3GPP TS 23.682 V14.1.0 (2016-09)

SUMMARY OF INVENTION

Technical Problem

In mobile communication, there is a case where a UE is temporarily unreachable in downlink (from network to terminal) communication due to power saving mode, reception conditions or the like of the UE. According to the procedure for downlink (from network to terminal) Non-IP data delivery in Section 5.13.3 of Non Patent Literature 1, when a UE is unreachable in downlink communication, Non-IP data delivery is carried out after the UE becomes reachable.

The MME receives a request for Non-IP data delivery (NIDD Submit Request) from the SCEF. When the MME detects that a UE is unreachable, it returns a response (NIDD Submit Response) to the Non-IP data delivery transmission request, which contains Cause indicating that Non-IP data has not been delivered to the UE. Cause set to the Non-IP data delivery transmission request further indicates that, when the MME detects that a UE has become reachable, the MME gives a notification (NIDD Submit Indication) to the SCEF.

Receiving the above-described response (NIDD Submit Response), the SCEF buffers Non-IP data until the NIDD Submit Indication is sent from the MME. The SCEF eventually re-sends the Non-IP data delivery transmission request upon receiving the NIDD Submit Indication from the MME.

An example of the case where a UE becomes reachable is when communication originated by a UE (MO (Mobile Originated) Communication) is initiated. When the MME detects initiation of MO Communication, it determines that a UE has become reachable and sends an NIDD Submit Indication message to the SCEF.

On the other hand, when a UE initiates MO Communication that sends Non-IP data and the MME receives the Non-IP data from the UE, the MME sends a Non-IP data delivery transmission request to the SCEF.

Thus, when a UE initiates MO Communication, there is a case where the MME sends, to the SCEF, the Non-IP data delivery transmission request and the NIDD Submit Indication at substantially the same timing or successively. In this case, when a large number of UEs initiate MO Communication at the same time, congestion can occur between the MME and the SCEF.

An object of the present invention is to provide an SCEF entity, a control node, a communication method and a program capable of reducing the number of messages between a control node such as an MME and an SCEF.

Solution to Problem

An SCEF entity according to a first aspect of the present invention includes a storage unit configured to buffer Non-IP data not delivered to a communication terminal through a control node, and a control unit configured to, upon receiving a control message sent from the control node in response to a communication event that has occurred in the communication terminal, transmit the Non-IP data buffered in the storage unit to the control node without waiting for transmission of an indication message from the control node, the indication message explicitly indicating that the Non-IP data is deliverable to the communication terminal.

A control node according to a second aspect of the present invention includes a communication unit configured to notify an SCEF entity of failure in delivering Non-IP data to a communication terminal, and a control unit configured to detect a communication event that has occurred in the communication terminal, wherein, when there is a control message to be sent to the SCEF entity in response to the communication event, the communication unit sends the control message to the SCEF entity without sending, to the SCEF entity, an indication message explicitly indicating that the Non-IP data is deliverable to the communication terminal.

A communication method according to a third aspect of the present invention includes buffering Non-IP data not delivered to a communication terminal through a control node, and upon receiving a control message sent from the control node in response to a communication event that has occurred in the communication terminal, sending the buffered Non-IP data to the control node without waiting for transmission of an indication message from the control node, the indication message explicitly indicating that the Non-IP data is deliverable to the communication terminal.

A program according to a fourth aspect of the present invention causes a computer to execute buffering Non-IP data not delivered to a communication terminal through a control node, and upon receiving a control message sent from the control node in response to a communication event that has occurred in the communication terminal, sending the buffered Non-IP data to the control node without waiting for transmission of an indication message from the control node, the indication message explicitly indicating that the Non-IP data is deliverable to the communication terminal.

Advantageous Effects of Invention

According to the present invention, it is possible to provide an SCEF entity, a control node, a communication method and a program capable of reducing the number of messages between an MME and an SCEF.

DESCRIPTION OF EMBODIMENTS

First Embodiment

Figure 1:
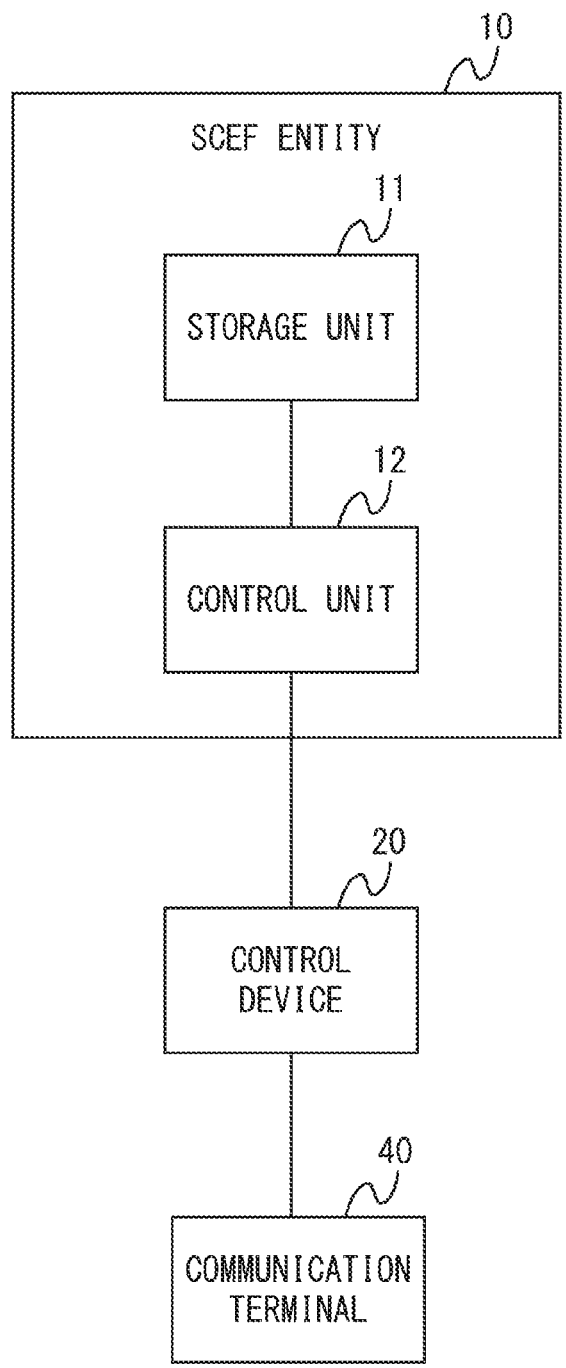
FIG. 1 is a block diagram of a communication system according to a first embodiment.

Embodiments of the present invention are described hereinafter with reference to the drawings. A configuration example of a communication system according to a first embodiment of the present invention is described with reference to FIG. 1. The communication system in FIG. 1 includes an SCEF (Service Capability Exposure Function) entity (which is referred to hereinafter as SCEF) 10, a control node 20, and a communication terminal 40. The SCEF 10, the control node 20, and the communication terminal 40 may be a computer device that operates by running, on a processor, a program stored in a memory.

The communication terminal 40 may be a mobile phone terminal, a smartphone terminal, a tablet terminal or the like. Alternatively, the communication terminal 40 may be an M2M (Machine to Machine) terminal, an MTC (Machine Type Communication) terminal, an IoT (Internet of Things) terminal or the like. The communication terminal 40 communicates with the control node 20 through a radio access network.

The control node 20 is a node device that is placed in a mobile network. The control node 20 is a node device that relays or processes control information in the mobile network. The control information may be called C-Plane data, C-Plane message or the like, for example. The control node 20 may be an MME, an SGSN (Serving GPRS (General Packet Radio Service) Support Node) defined in 3GPP or the like, for example.

The SCEF 10 is a node device whose operation is defined by 3GPP. The SCEF 10 is a mobile network defined by 3GPP, and it is placed between a mobile network managed by a mobile telecommunications carrier and a server device or the like, such as an application server, managed by a third party different from the mobile telecommunications carrier. The SCEF 10 securely provides, to an application server or the like, information about a service available in a mobile network and capabilities for providing the service.

Further, the SCEF 10 delivers or distributes Non-IP data sent from an application server or the like to the communication terminal 40 through the control node 20 in the mobile network. In the following description, the term "delivery" may be replaced with "distribution". Non-IP data is data not using IP protocol stack. Non-IP data is data where data packets to be used for communication are not structured in terms of EPS (Evolved Packet System). For example, technology that is collectively called LPWA (Low Power Wide Area), such as LoRa, SIGFOX, and NB-IoT, for example, does not establish an IP data bearer for the purpose of reducing power consumption of a device. To deal with this issue, a mechanism for exchanging low-volume data in C-plane (Non-IP Data Delivery (NIDD)) is defined in a 3GPP network. Non-IP data is sent as control information in a mobile network. Non-IP data may be data sent to an IoT terminal to receive an IoT service, for example.

A configuration example of the SCEF 10 is described next. The SCEF 10 includes a storage unit 11 and a control unit 12. The control unit 12 may be software, a module or the like whose processing is executed by running, on a processor, a program stored in a memory. Alternatively, the control unit 12 may be hardware such as a chip or a circuit. The storage unit 11 may be a memory, for example.

The storage unit 11 buffers Non-IP data that has not been delivered to the communication terminal 40 through the control node 20. In other words, the storage unit 11 temporarily stores, holds or retains Non-IP data until re-sending Non-IP data to the communication terminal 40. The case where Non-IP data is not delivered to the communication terminal 40 is when the communication terminal 40 is in power saving mode, when reception conditions become so worse that radio communication cannot be conducted or the like, for example. The state where Non-IP data is not delivered to the communication terminal 40 may be referred to as the state where the communication terminal 40 is unreachable. On the other hand, the state where Non-IP data can be delivered to the communication terminal 40 may be referred to as the state where the communication terminal 40 is reachable.

When the control unit 12 receives a control message sent from the control node 20 in response to a communication event that has occurred in the communication terminal 40, it sends Non-IP data buffered in the storage unit 11 to the control node 20 without waiting for transmission of an indication message explicitly indicating that it is in a state where Non-IP data can be delivered to the communication terminal 40 from the control node 20.

The communication event that has occurred in the communication terminal 40 may be the initiation of data transmission by the communication terminal 40, for example. The data sent by the communication terminal 40 may be user data or control information. The user data may be referred to as U-Plane data, U-Plane message or the like, for example.

The control message sent from the control node 20 is a message related to the communication event that has occurred in the communication terminal 40, and it is a different message from the indication message explicitly indicating that Non-IP data is deliverable to the communication terminal 40.

As described above, the control unit 12 of FIG. 1 can send Non-IP data buffered in the storage unit 11 to the communication terminal 40 through the control node 20 without receiving the indication message explicitly indicating that Non-IP data is deliverable to the communication terminal 40.

In other words, by receiving the control message related to a communication event that has occurred in the communication terminal 40, the control unit 12 can presume that the communication terminal 40 is in a state where Non-IP can be delivered, even without receiving the indication message explicitly indicating that Non-IP data is deliverable to the communication terminal 40.

This prevents transmission of the indication message explicitly indicating that Non-IP data is deliverable to the communication terminal 40 between the control node 20 and the SCEF 10. This consequently reduces the number of messages sent between the control node 20 and the SCEF 10.

Second Embodiment

A configuration example of a communication system according to a second embodiment of the present invention is described hereinafter with reference to FIG. 2. The communication system in FIG. 2 includes an SCEF 10, an MME 22, an SGSN 24, a RAN (Radio Access Network) 26, an AS 32, an SCS 34, and an UE 42.

The MME 22 and the SGSN 24 correspond to the control node 20 in FIG. 1. The UE 42 corresponds to the communication terminal 40 in FIG. 1. The UE 42 is used as a general term for communication terminals in 3GPP.

The RAN 26 may be an eNB that supports LTE communication, for example, and it may be a NodeB that supports radio communication defined as so-called 3G communication in 3GPP and an RNC (Radio Network Controller) that controls the NodeB.

The MME 22 and the SGSN 24 may be referred to as a CPF (C-Plane Function) entity (which is referred to hereinafter as CPF). The MME 22 and the SGSN 24 are devices that mainly make mobility management of the UE 42, bearer setup request, bearer setup instruction, bearer deletion request or bearer deletion instruction.

The AS 32 and the SCS 34 are devices to be used for providing an application service to the UE 42. An application service may be referred to as an IoT service, for example. The AS 32 or the SCS 34 sends Non-IP data to the SCEF 10. In the following description, the AS 32 or the SCS 34 is sometimes referred to as an AS 32/SCS 34 or an SCS 34/AS 32.

The SCEF 10 sends the Non-IP data sent from the SCS 34/AS 32 to the MME 22 or the SGSN 24. The MME 22 or the SGSN 24 delivers the Non-IP data to the UE 42 through the RAN 26. When the UE 42 is unreachable, the MME 22 or the SGSN 24 gives a notification to the SCEF 10. In this case, the SCEF 10 buffers the Non-IP data that has not been delivered to the UE 42.

Figure 2:
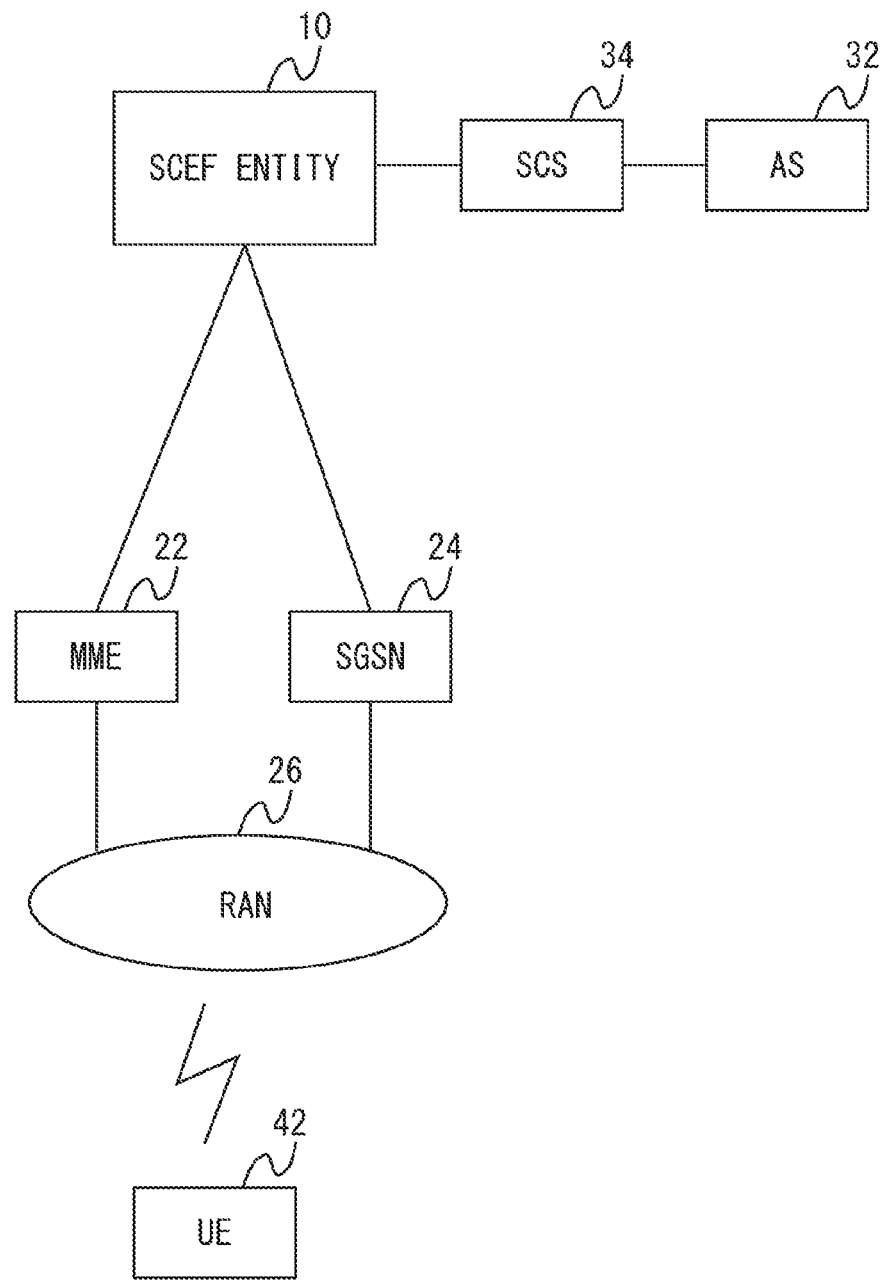
FIG. 2 is a block diagram of a communication system according to a second embodiment.

Further, FIG. 2 shows the configuration where the SCEF 10, the MME 22, the RAN 26 and the SGSN 24 belong to an HPLMN (Home Public Land Mobile Network). On the other hand, in the case where the SCEF 10 belongs to the HPLMN and the MME 22, the SGSN 24 and the RAN 26 belong to a VPLMN (Visited PLMN), IWK (Interworking)-SCEF may be placed between the SCEF 10 and the MME 22 and between the SCEF 10 and the SGSN 24. The IWK-SCEF is placed in the VPLMN and relays communication between the SCEF 10 and the MME 22 and between the SCEF 10 and the SGSN 24.

Hereinafter, 5.13.3 Mobile Terminated NIDD procedure disclosed in Non Patent Literature 1 is described with reference to FIG. 3 as a comparative example in the second embodiment.

First, the SCS 34/AS 32 sends an NIDD Submit Request message to the SCEF 10 (S11). The NIDD Submit Request message contains an External Identifier or an MSISDN (Mobile Subscriber Integrated Service Digital Network Number). Further, the NIDD Submit Request message contains an SCS/AS Reference ID and Non-IP data. The External Identifier and the MSISDN are identification information of the UE 42. The SCS/AS Reference ID is identification information of the SCS 34 or the AS 32.

When the SCEF 10 receives the NIDD Submit Request message from the SCS 34/AS 32, it checks whether there is SCEF EPS bearer context associated with the External Identifier or the MSISDN (S12). Further, when the SCEF 10 receives the NIDD Submit Request message from the SCS 34/AS 32, it checks whether the SCS 34/AS 32 is authorized to send an NIDD Submit Request message (S12). Furthermore, when the SCEF 10 receives the NIDD Submit Request message from the SCS 34/AS 32, it checks whether at least one of the allowed traffic and load of Non-IP data allowed for the SCS/AS is exceeded or not (S12). The allowed traffic may be a cumulative amount of data sent per day, for example.

The SCEF EPS bearer context is information indicating that a bearer for sending Non-IP data is established between the MME 22 and the SCEF 10. T6a is specified by 3GPP as a reference point between the MME 22 and the SCEF 10. A bearer between the MME 22 and the SCEF 10 is established during Attach processing of the UE 42. The SGSN 24 is used instead of the MME 22 in some cases. T6b is specified by 3GPP as a reference point between the SGSN 24 and the SCEF 10.

Next, when there is SCEF EPS bearer context, the SCS 34/AS 32 is authorized to send an NIDD Submit Request message, and further the allowed traffic and load of Non-IP data allowed for the SCS 34/AS 32 is not exceeded, the SCEF 10 sends an NIDD Submit Request message to the MME 22 (S13). The NIDD Submit Request message contains User Identity, EPS (Evolved Packet System) Bearer ID, SCEF ID, Non-IP data, SCEF Wait Time, and Maximum Re-transmission time. The EPS bearer ID is identification information of a bearer set up between the SCEF 10 and the MME 22. The SCEF Wait Time is a time during which the SCEF 10 can wait for a Response message sent from the MME 22. The Maximum Re-transmission time is a time when the SCEF 10 can re-send a message.

The MME 22 receives the NIDD Submit Request message, and then detects that the UE 42 is unreachable. In this case, the MME 22 sends an NIDD Submit Response message to the SCEF (S14). The NIDD Submit Response message contains Cause and Requested Re-transmission Time. The Cause indicates that Non-IP data is not delivered to the UE 42 because the UE 42 is in power saving mode and thus temporarily not reachable, and when the MME 22 detects that the UE has become reachable, the MME 22 gives a notification (NIDD Submit Indication) to the SCEF 10.

The Requested Re-transmission Time indicates a predicted time when the SCEF 10 will become able to re-send downlink data to the UE 42 that is currently unreachable.

Further, when the MME 22 detects that the UE has become reachable, the MME 22 sets a Not Reachable for NIDD flag indicating notification to the SCEF 10.

The SCEF 10 receives the NIDD Submit Response message from the MME 22, and then refers to Cause value indicating that the UE 42 is in power saving mode and thus temporarily not reachable, and thereby finds that the UE 42 is unreachable. Further, the SCEF 10 buffers the Non-IP data tried to be sent in Step S13

Then, the SCEF 10 sends an NIDD Submit Response message containing a result received from the MME 22 to the SCS 34/AS 32 (S15).

After that, when the MME 22 detects that the UE 42 is reachable or about to become reachable, it checks whether a Not Reachable for NIDD flag for this UE is set or not. When the Not Reachable for NIDD flag is set, the MME 22 sends an NIDD Submit Indication message to the SCEF 10 that has received the NIDD Submit Response message in Step S14 (Step S16). The NIDD Submit Indication message contains User Identity. For example, the MME 22 detects that the UE 42 is reachable when the UE 42 recovers from power saving mode by executing TAU (Tracking Area Update) or when Mobile Originated communication is started or the like, for example. Further, the MME 22 clears the Not Reachable for NIDD flag for this UE.

The SCEF 10 receives the NIDD Submit Indication message from the MME 22, and then sends the buffered Non-IP data to the MME 22 by using the NIDD Submit Request message (S17).

Next, the MME 22 receives the NIDD Submit Request message and then delivers the Non-IP data to the UE 42 (S18). For example, when C-plane connection is established between the UE 42 and the MME 22, the MME 22 immediately sends the Non-IP data to the UE 42. When, on the other hand, C-plane connection is not established between the UE 42 and the MME 22, the MME 22 performs paging to call the UE 42. After establishing C-plane connection with the UE 42 by paging, the MME 22 sends the Non-IP data to the UE 42.

Then, when Non-IP data delivery in Step S18 is initiated successfully, the MME 22 sends an NIDD Submit Response message to the SCEF 10 (S19). The NIDD Submit Response message contains cause value indicating successful initiation of Non-IP data delivery. Further, the SCEF 10 sends the NIDD Submit Response message received from the MME 22 to the SCS 34/AS 32 (S19).

The flow of a delivery process of Non-IP data according to the second embodiment is described hereinafter with reference to FIG. 4. In FIG. 4, the same processing as in FIG. 3 is denoted by the same reference symbols as in FIG. 3. Steps S11 to S15 in FIG. 4 are the same as in FIG. 3 and therefore detailed description thereof is omitted.

Then, the UE 42 initiates processing that the UE 42 sends Non-IP data to the MME 22 (S21). The processing that the UE 42 sends Non-IP data to the MME 22 is MO (Mobile Originated) NIDD Procedure. The UE 42 sends Non-IP data to the MME 22 by using a NAS (Non Access Stratum) message. Non-IP data and EPS bearer ID are set to the NAS message.

The MME 22 then sends an NIDD Submit Request message to the SCEF 10 (S22). The NIDD Submit Request message contains User Identity, EPS Bearer ID, and Non-IP data.

The MME 22 finds that the UE 42 is reachable by receiving the NAS message from the UE 42 in Step S21. Further, the MME 22 tries to notify the SCEF 10 that the UE 42 is reachable by sending the NIDD Submit Request message to the SCEF 10. Thus, when the MME 22 detects that the UE 42 is reachable in Step S16 of FIG. 3, the MME 22 does not skip sending the NIDD Submit Indication message, which has been sent to the SCEF 10 when the Not Reachable for NIDD flag is set for this UE, before and after Step S22 in FIG. 4. Further, the MME 22 clears the Not Reachable for NIDD flag for the UE.

The SCEF 10 receives Non-IP data from the MME 22, and sends the received Non-IP data to the SCS 34/MME 22 by using an NIDD Request message (S23).

The SCEF 10 then finds that the UE 42 is reachable by receiving the NIDD Submit Request message in Step S22. Thus, to send the buffered Non-IP data, the SCEF 10 performs processing after Step S17. Steps S17 to S19 in FIG. 4 are the same as in FIG. 3 and therefore detailed description thereof is omitted. Further, the SCEF 10 may send the NIDD Submit Request message in Step S17 to the MME 22 before sending the NIDD Request message to the SCS 34/AS 32 in Step S23.

Figure 5:
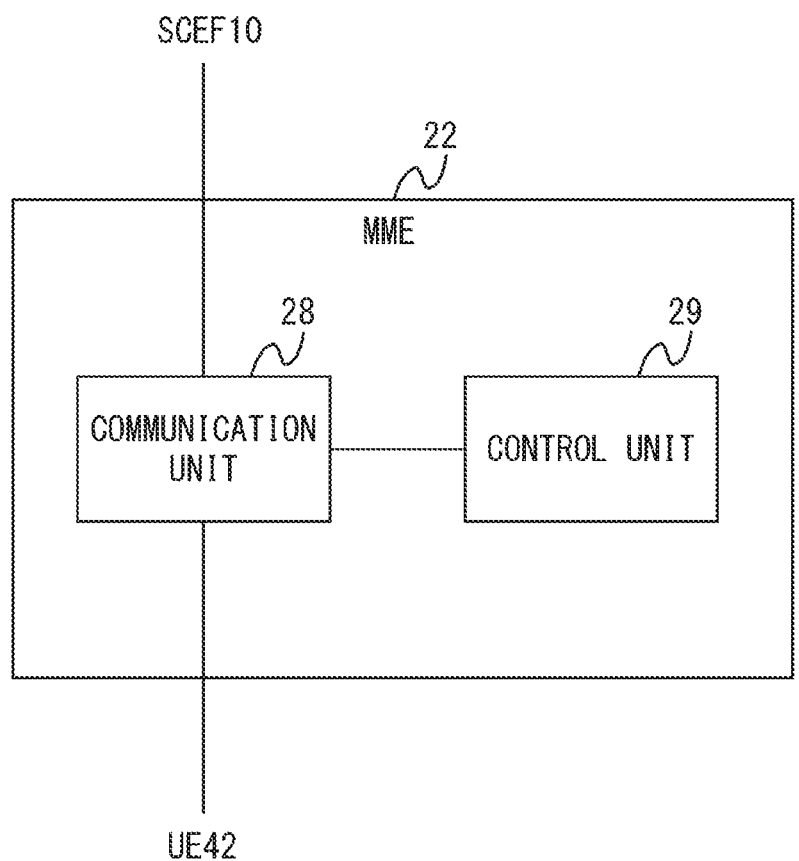
FIG. 5 is a block diagram of an MME according to the second embodiment.

A configuration example of an MME 22 according to the second embodiment is described with reference to FIG. 5. The MME 22 includes a communication unit 28 and a control unit 29. The communication unit 28 and a control unit 29 may be software, a module or the like whose processing is executed by running, on a processor, a program stored in a memory. Alternatively, the communication unit 28 and a control unit 29 may be hardware such as a chip or a circuit.

The communication unit 28 communicates with the SCEF 10 and the UE 42. For example, the communication unit 28 relays Non-IP data sent between the UE 42 and the SCEF 10.

The control unit 29 generates or selects a control message to be sent to the SCEF 10 or the UE 42 through the communication unit 28. For example, the control unit 29 determines whether or not to send an NIDD Submit Indication message to the SCEF 10.

The flow of a process of determining whether or not to send an NIDD Submit Indication message according to the second embodiment is described with reference to FIG. 6.

Figure 3:
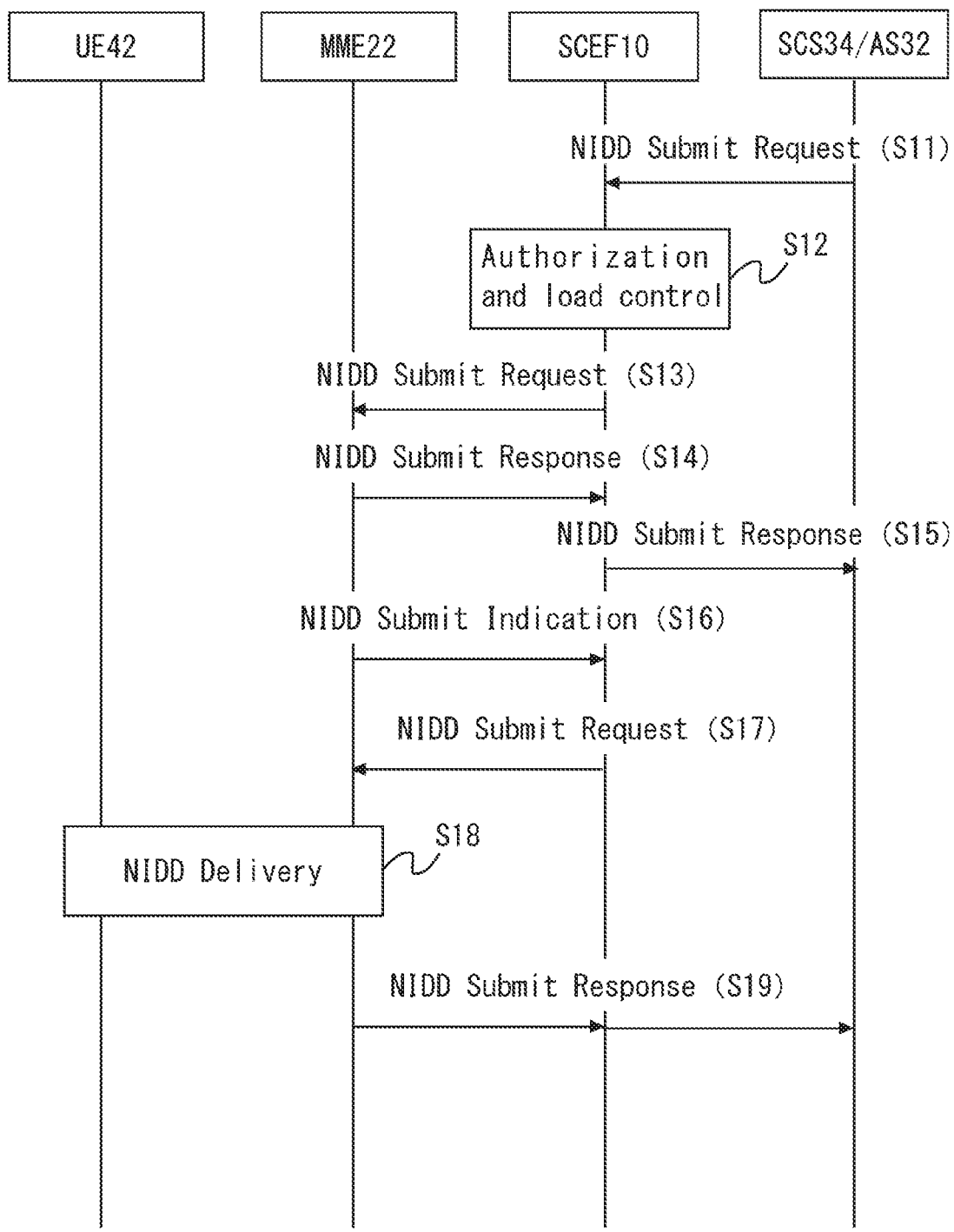
FIG. 3 is a view showing 5.13.3 Mobile Terminated NIDD procedure disclosed in Non Patent Literature 1.
Figure 4:
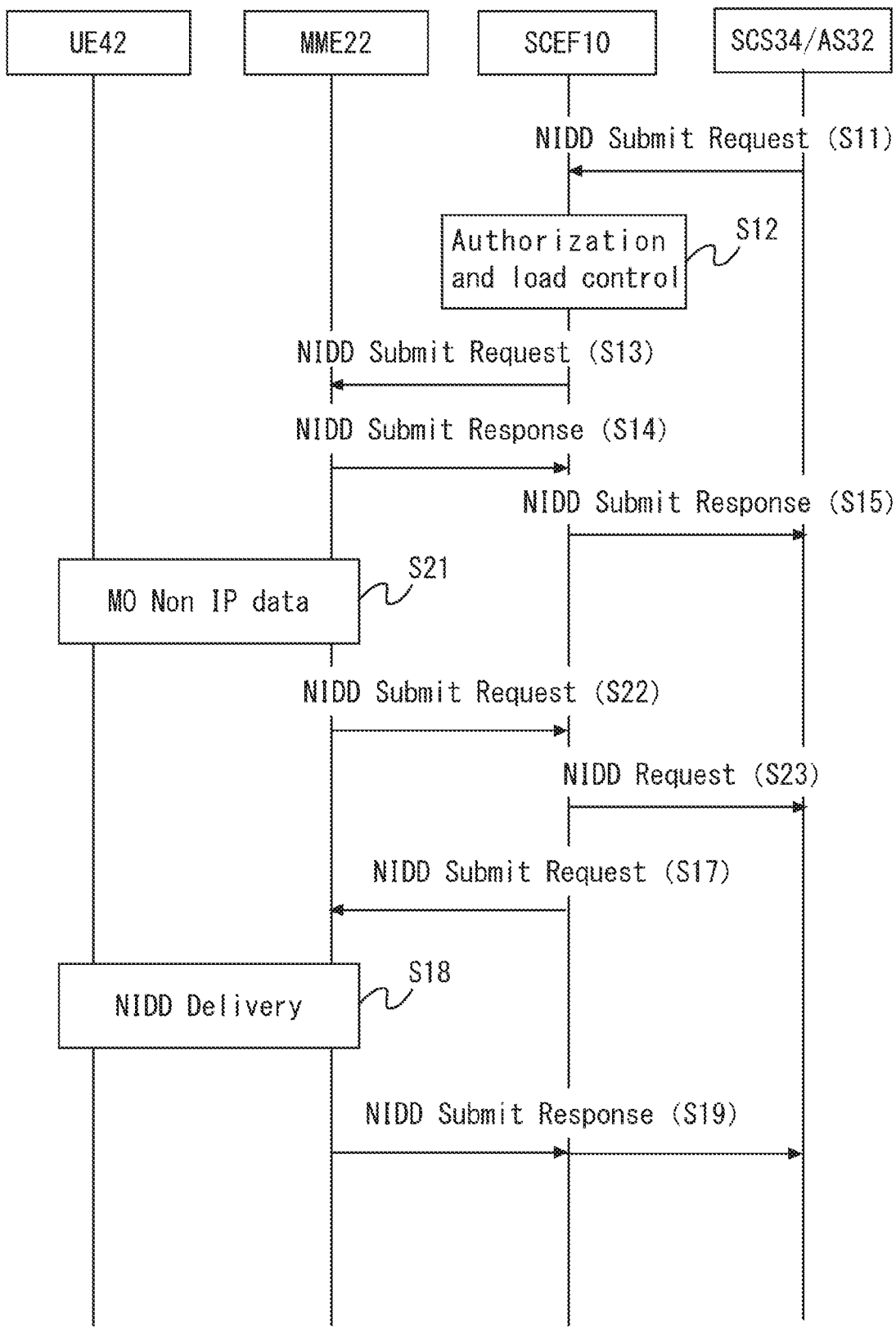
FIG. 4 is a view showing the flow of a delivery process of Non-IP data according to the second embodiment.

First, when the control unit 29 receives Non-IP data in Step S13 of FIG. 3, it determines that the UE 42 is unreachable and Non-IP data cannot be delivered to the UE 42 (S31).

Next, the control unit 29 receives data related to a communication event that has occurred in the UE 42 in Step S21 of FIG. 4 (S32). For example, the control unit 29 receives an NAS message containing Non-IP data from the UE 42.

The control unit 29 then determines whether User Identity indicating the UE being the delivery destination of Non-IP data failed to be delivered in Step S31, and User Identity indicating the UE being the sender of data received in Step S32 match or not (S33). For example, the control unit 29 compares User Identity contained in the NIDD Submit Request message received in Step S13 of FIG. 4 and User Identity indicating the UE being the sender of the NAS message containing Non-IP data received in Step S21 of FIG. 4.

When the control unit 29 determines that User Identity contained in the NIDD Submit Request message received in Step S13 of FIG. 4 and User Identity indicating the UE being the sender of the NAS message received in Step S21 of FIG. 4 do not match, it repeats processing after Step S32.

When, on the other hand, the control unit 29 determines that User Identity contained in the NIDD Submit Request message received in Step S13 of FIG. 4 and User Identity indicating the UE being the sender of the NAS message received in Step S21 of FIG. 4 match, it performs processing after Step S34.

The control unit 29 determines whether there is a message to be sent to the SCEF 10 based on the communication event that has occurred in the UE 42 in Step S34 (S34). For example, when the control unit 29 receives Non-IP data from the UE 42, it needs to send an NIDD Submit Request message to the SCEF 10 in order to send the Non-IP data. Therefore, when the control unit 29 receives Non-IP data in Step S32, for example, it determines that there is a message to be sent to the SCEF 10. In this case, the control unit 29 does not send an NIDD Submit Indication message to the SCEF 10 (S35). Specifically, the control unit 29 notifies the SCEF 10 that the UE 42 is reachable by sending the NIDD Submit Request message.

When the control unit 29 receives user data or the like, not Non-IP data, for example, in Step S32, there is no message to be sent to the SCEF 10. In this case, the SCEF 10 determines that there is no message to be sent to the SCEF 10. In this case, the control unit 29 cannot notify the SCEF 10 that the UE 42 is reachable by using a message other than the NIDD Submit Indication message. Therefore, the control unit 29 sends the NIDD Submit Indication message to the SCEF 10 (S36).

The flow of a re-transmission process of Non-IP data according to the second embodiment is described hereinafter with reference to FIG. 7. First, the control unit 12 receives the NIDD Submit Response message in Step S14 of FIG. 4, and buffers undelivered Non-IP data into the storage unit 11 (S41). Next, the control unit 12 receives Non-IP data sent from the UE in Step S22 of FIG. 4 (S42).

Then, the control unit 12 determines whether User Identity indicating the UE being the delivery destination of undelivered Non-IP data received in Step S41 and User Identity indicating the UE being the sender of Non-IP data received in Step S42 match or not (S43). For example, the control unit 12 determines whether User Identity contained in the NIDD Submit Request message sent in Step S13 of FIG. 4 and User Identity contained in the NIDD Submit Request message received in Step S22 match or not.

When the control unit 12 determines that User Identity contained in the NIDD Submit Request message sent in Step S13 of FIG. 4 and User Identity contained in the NIDD Submit Request message received in Step S22 match, it re-sends the buffered Non-IP data to the UE 42 (S44). When, on the other hand, the control unit 12 determines that User Identity contained in the NIDD Submit Request message sent in Step S13 of FIG. 4 and User Identity contained in the NIDD Submit Request message received in Step S22 do not match, it does not re-send the buffered Non-IP data until receiving an NIDD Submit Indication message, which is an indication message from the MME 22 (S45).

As described above, the MME 22 according to the second embodiment can determine whether or not to send the NIDD Submit Indication message indicating that the UE 42 is reachable when undelivered Non-IP data is buffered in the SCEF 10. Further, the SCEF 10 can determine whether or not to re-send the buffered Non-IP data without receiving the NIDD Submit Indication message when it receives the NIDD Submit Request message sent from the MME 22.

When User Identity indicating the UE being the delivery destination of buffered Non-IP data and User Identity indicating the UE being the sender of Non-IP data sent from the UE match, the SCEF 10 can re-send the buffered Non-IP data without receiving the NIDD Submit Indication message. This reduces the number of NIDD Submit Indication messages sent between the MME 22 and the SCEF 10.

Third Embodiment

Figure 8:
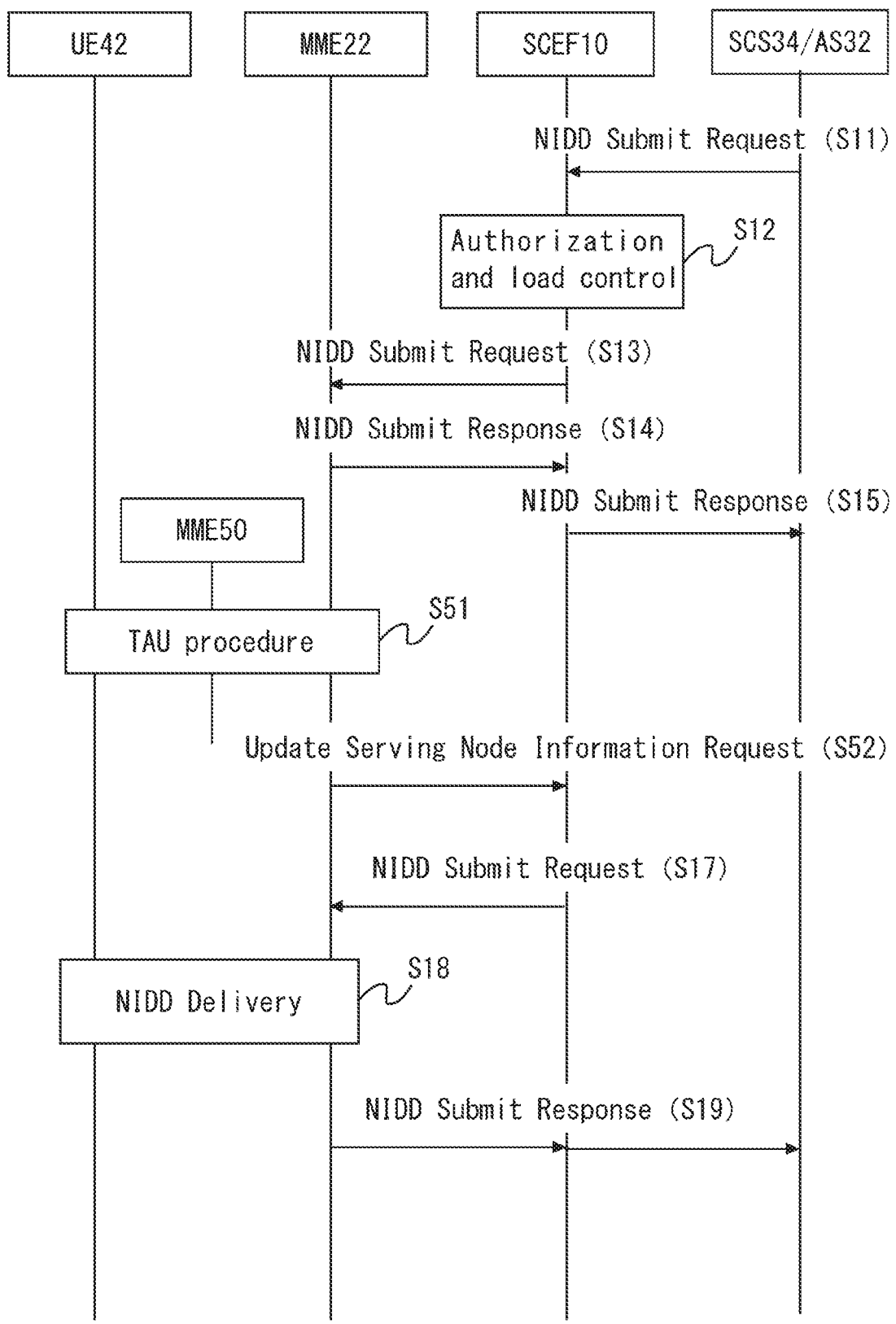
FIG. 8 is a view showing the flow of a delivery process of Non-IP data according to a third embodiment.

The flow of a delivery process of Non-IP data according to a third embodiment is described hereinafter with reference to FIG. 8. In FIG. 8, the same processing as in FIG. 4 is denoted by the same reference symbols as in FIG. 4. Steps S11 to S15 in FIG. 8 are the same as in FIG. 4 and therefore detailed description thereof is omitted.

Tracking Area Update (TAU) procedure is performed among a UE 42, an MME 22, and an MME 50 (S51). In this example, the UE 42 moves with change in MME. The MME 50 is an MME that manages the UE 42 before movement, and it may be referred to as Old MME. The MME 22 is an MME that manages the UE 42 after movement, and it may be referred to as New MME.

In the TAU procedure of Step S51, the MME 50 sends, to the MME 22, subscriber information (UE Context) related to the UE 42. The subscriber information contains non-IP PDN (Packet Data Network) connection information, which is information about the SCEF 10 being the destination of Non-IP data. Further, information of Not Reachable for NIDD flag for the UE 42 is also taken over from the MME 50 to the MME 22.

Then, the MME 22 sends a Update Serving Node Information Request message to the SCEF 10 in order to create PDN connection with the SCEF 10 (S52). The Update Serving Node Information Request message contains User Identity, EPS Bearer Identity, SCEF ID and APN of the UE 42. The SCEF ID and APN are information identifying the SCEF 10.

The MME 22 finds that the UE 42 is reachable by executing the TAU procedure related to the UE 42 in Step S51. Further, the MME 22 tries to notify the SCEF 10 that the UE 42 is reachable by sending the Update Serving Node Information Request message to the SCEF 10. Thus, when the MME 22 detects that the UE 42 is reachable in Step S16 of FIG. 3, the MME 22 does not send the NIDD Submit Indication message, which has been sent to the SCEF 10 when the Not Reachable for NIDD flag is set for this UE, before and after Step S52 in FIG. 8. Further, the MME 22 clears the Not Reachable for NIDD flag for the UE.

The SCEF 10 finds that the UE 42 is reachable by receiving the Update Serving Node Information Request message in Step S52. Thus, to send the buffered Non-IP data, the SCEF 10 performs processing after Step S17. Steps S17 to S19 in FIG. 8 are the same as in FIG. 4 and therefore detailed description thereof is omitted.

Figure 6:
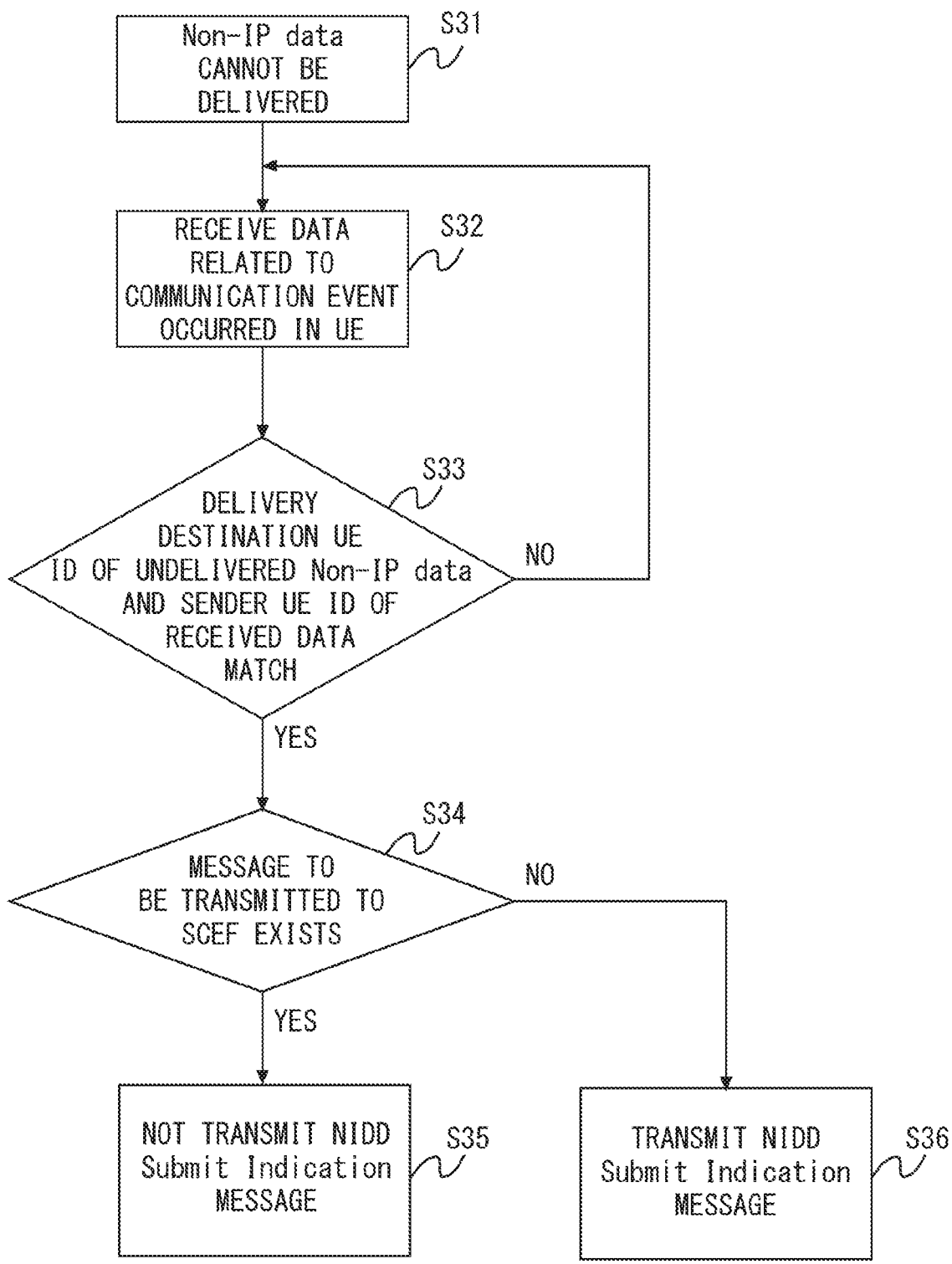
FIG. 6 is a view showing the flow of a process of determining whether or not to send an NIDD Submit Indication message according to the second embodiment.

Further, the MME 22 that performs the process of FIG. 8 determines whether or not to send the NIDD Submit Indication message by performing the same process as in FIG. 6. The MME 22 that performs the process of FIG. 8 receives the subscriber information of the UE 42 as data related to a communication event that has occurred in the UE in Step S32, for example. Further, in Step S33, the control unit 29 compares User Identity indicating the UE being the delivery destination of undelivered Non-IP data and User Identity indicating the UE having executed the TAU procedure.

Further, in Step S34, the control unit 29 determines that there is a Update Serving Node Information Request message as a message to be sent to the SCEF 10.

Figure 7:
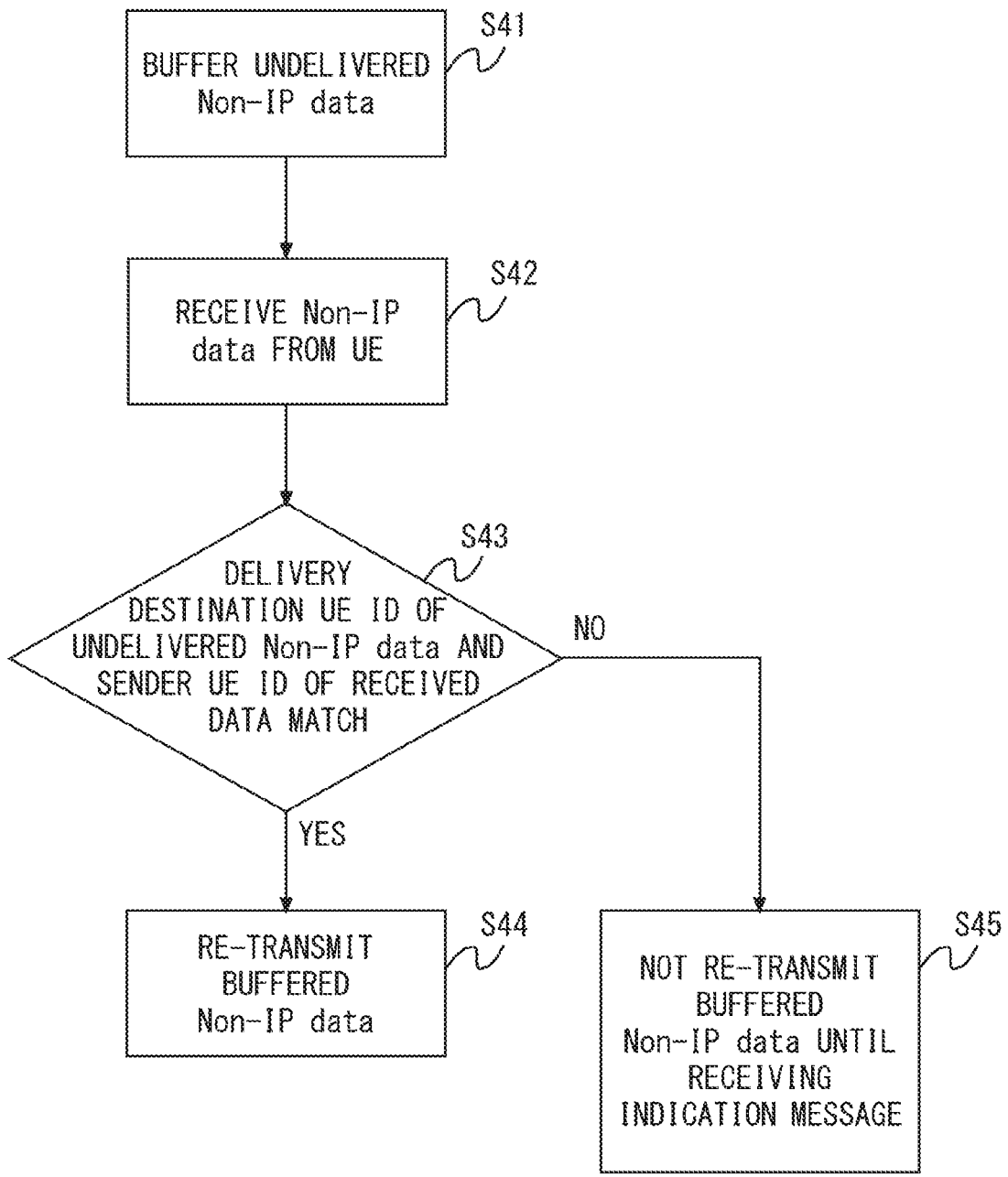
FIG. 7 is a view showing the flow of a re-transmission process of Non-IP data according to the second embodiment.

Further, the SCEF 10 that performs the process of FIG. 8 determines whether or not to re-send the buffered Non-IP data by performing the same process as in FIG. 7. The SCEF 10 that performs the process of FIG. 8 receives a message (Update Serving Node Information Request message) related to the TAU procedure executed by the UE 42, instead of receiving Non-IP data from the UE in Step S42, for example. Further, in Step S43, it compares User Identity indicating the UE being the delivery destination of undelivered Non-IP data and User Identity indicating the UE having executed the TAU procedure.

As described above, the MME 22 according to the third embodiment can determine whether or not to send an NIDD Submit Indication message indicating that the UE 42 is reachable when undelivered Non-IP data is buffered in the SCEF 10. Further, the SCEF 10 can determine whether or not to re-send the buffered Non-IP data without receiving the NIDD Submit Indication message when it receives the Update Serving Node Information Request message sent from the MME 22.

When User Identity indicating the UE being the delivery destination of buffered Non-IP data and User Identity indicating the UE having executed the TAU procedure match, the SCEF 10 can re-send the buffered Non-IP data without receiving the NIDD Submit Indication message. This reduces the number of NIDD Submit Indication messages sent between the MME 22 and the SCEF 10.

Fourth Embodiment

Traffic and load control when sending Non-IP data according to a fourth embodiment is described hereinafter. The SCEF 10 according to the fourth embodiment applies traffic and load control so as not to exceed the allowed traffic and load of Non-IP data allowed for the SCS 34/AS 32 when sending Non-IP data to the MME 22 in Step S17 of FIGS. 4 and 8. Thus, the SCEF 10 applies traffic and load control also when sending Non-IP data in Step S17 of FIGS. 4 and 8, in addition to when sending Non-IP data to the MME 22 in Step S13 of FIGS. 4 and 8.

Further, in Step S17 of FIGS. 4 and 8, when the SCEF 10 sends Non-IP data to the MME 22, the SCEF 10 may perform traffic and load control so as not to exceed the allowed traffic and load of Non-IP data allowed for the SCEF 10, instead of the allowed traffic and load of Non-IP data allowed for the SCS 34/AS 32.

Further, in Step S17 of FIGS. 4 and 8, when the SCEF 10 sends Non-IP data to the MME 22, the SCEF 10 may apply traffic and load control so as not to exceed the allowed traffic and load of Non-IP data allowed for the UE 42.

Further, in Step S17 of FIGS. 4 and 8, when the SCEF 10 buffers a plurality of Non-IP data, the SCEF 10 sends Non-IP data to the MME 22 sequentially in order of buffering. Sending Non-IP data to the MME 22 sequentially in order of buffering means sending Non-IP data to the MME 22 sequentially from the oldest to the newest.

The flow of a process where the SCEF 10 receives information about allowed traffic and load of Non-IP data allowed for the UE 42 according to the fourth embodiment is described hereinafter with reference to FIG. 9.

First, the SCS 34/AS 32 sends an NIDD Configuration Request message to the SCEF 10 (S61). The NIDD Configuration Request message contains an External Identifier or MSISDN. The External Identifier or the MSISDN is information that identifies the UE 42. The NIDD Configuration Request message further contains an SCS/AS Reference ID. The SCEF 10 then stores the External Identifier or the MSISDN and the SCS/AS Reference ID contained in the NIDD Configuration Request message into the storage unit 11 (S62).

Then, the SCEF 10 sends an NIDD Authorization Request message to an HSS (Home Subscriber Server) in order to check whether the SCS 34/AS 32 is authorized to send the received NIDD Configuration Request message related to the External Identifier or the MSISDN (S63). The NIDD Authorization Request message contains the External Identifier or the MSISDN and further APN (Access Point Name) associated with the SCEF 10. The HSS is a node device that manages subscriber information related to a plurality of UEs.

Next, the HSS determines that the SCS 34/AS 32 is authorized to send the NIDD Configuration Request message (S64). Further, the HSS extracts IMSI (International Mobile Subscriber Identity) associated with the External Identifier or the MSISDN contained in the NIDD Authorization Request message. The IMSI is used as identification information of the UE in the mobile network.

The HSS then sends an NIDD Authorization Response message to the SCEF 10 as a response to the NIDD Authorization Request message (S65). The NIDD Authorization Response message contains the IMSI associated with the External Identifier or the MSISDN. The NIDD Authorization Response message further contains LoadControlInformation indicating at least one of the allowed traffic and load of Non-IP data allowed for the UE 42. It is assumed that the HSS manages, for each UE, at least one of the allowed traffic and load of Non-IP data allowed for each UE as subscriber information.

Then, the SCEF 10 sends an NIDD Configuration Response message to the SCS 34/AS 32 as a response to the NIDD Configuration Request message (S66).

Figure 9:
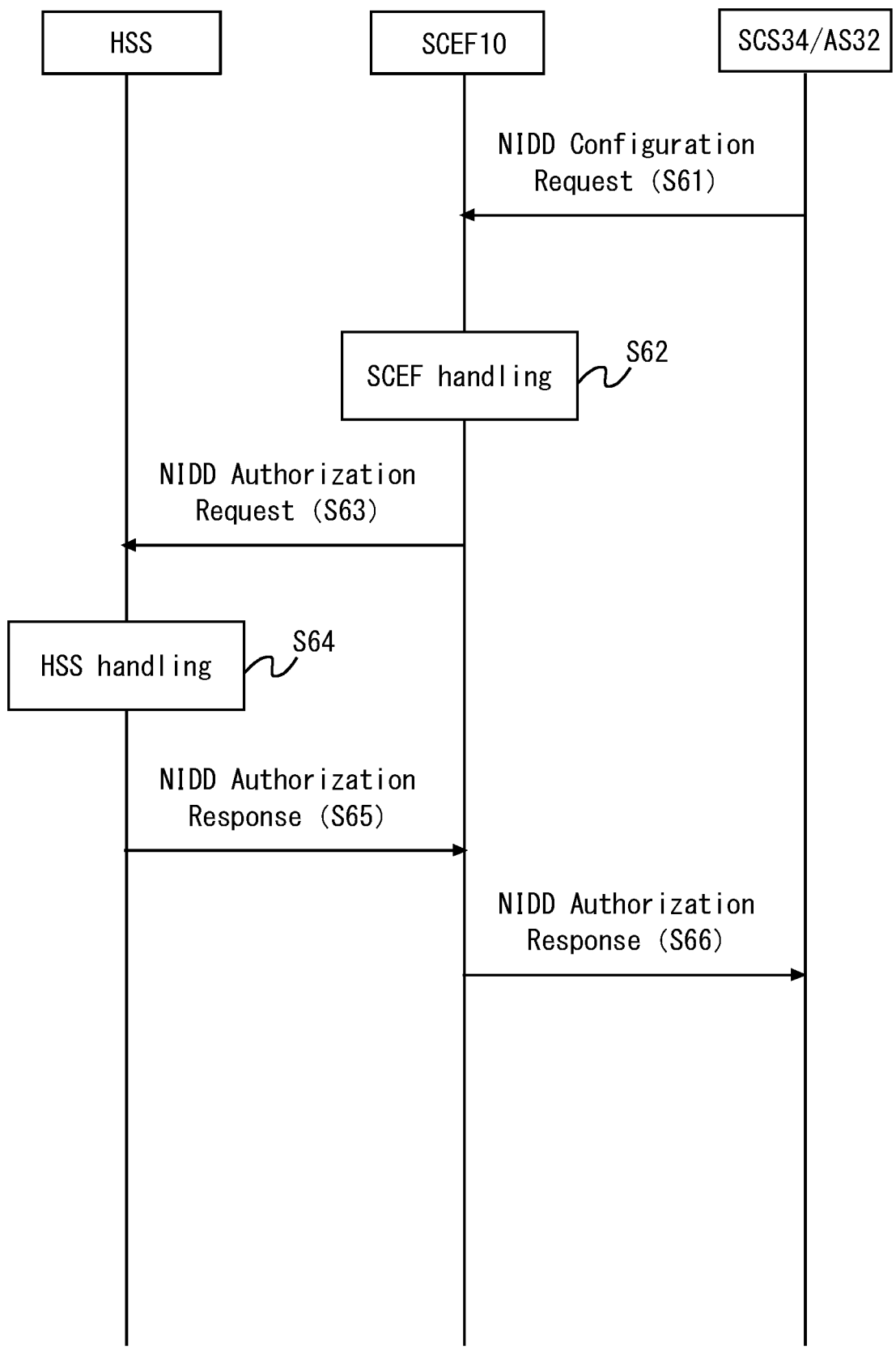
FIG. 9 is a view showing the flow of a process where an SCEF receives information about allowed traffic and load of Non-IP data allowed for a UE according to a fourth embodiment.

By performing the process of FIG. 9, the SCEF 10 can acquire, from the HSS, information indicating at least one of the allowed traffic and load of Non-IP data allowed for the UE 42.

Further, the SCEF 10 can send Non-IP data to the UE 42 according to the same sequence as in FIGS. 4 and 8. Note that, however, the SCEF 10 applies traffic and load control so as not to exceed the allowed traffic and load of Non-IP data allowed for the UE 42 when sending Non-IP data to the MME 22 in Step S17 of FIGS. 4 and 8.

As described above, the SCEF 10 can apply traffic and load control so as not to exceed the allowed traffic and load of Non-IP data allowed for any one of the SCS 34/AS 32, the SCEF 10 and the UE 42 when sending buffered Non-IP data to the MME 22. It is thereby possible to reduce or prevent the case where the UE 42 such as an IoT device, which is low in performance in terms of communication speed, fails to receive Non-IP data.

Fifth Embodiment

Figure 10:
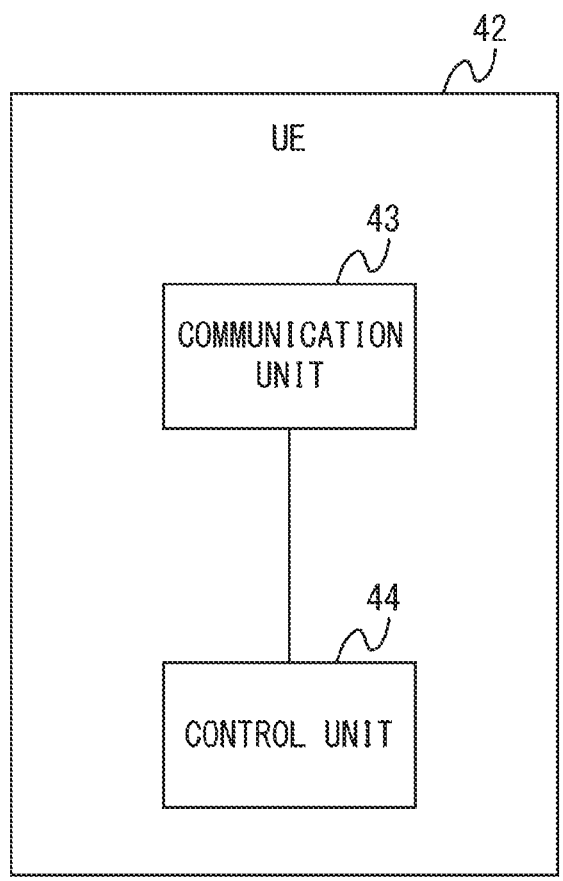
FIG. 10 is a block diagram of a UE according to a fifth embodiment.

A configuration example of a UE 42 according to a fifth embodiment of the present invention is described with reference to FIG. 10. The UE 42 includes a communication unit 43 and a control unit 44. The communication unit 43 and the control unit 44 may be software, a module or the like whose processing is executed by running, on a processor, a program stored in a memory. Alternatively, the communication unit 43 and the control unit 44 may be hardware such as a chip or a circuit.

The communication unit 43 receives Non-IP data delivered from the MME 22. The communication unit 43 receives a plurality of Non-IP data by using one message. Specifically, the MME 22 sends one message containing a plurality of Non-IP data to the UE 42, rather than repeatedly sending Non-IP data the same number of times as the number of Non-IP data buffered in the SCEF 10. The communication unit 43 outputs one message containing a plurality of Non-IP data to the control unit 44.

The control unit 44 reads a plurality of Non-IP data contained in one message for each Non-IP data. In other words, the control unit 44 reads a plurality of Non-IP data contained in one message by isolating them for each Non-IP data. Further, in other words, the control unit 44 parses and reads a plurality of Non-IP data contained in one message.

The control unit 44 may have information about the data size of Non-IP data, for example. For example, in one message containing a plurality of Non-IP data, information about the data size of each of the Non-IP data may be set. Alternatively, in the case where the data size of Non-IP data is predetermined in a mobile network, the control unit 44 may have information about the predetermined data size of Non-IP data. The control unit 44 may read a plurality of Non-IP data contained in one message according to the data size of Non-IP data. Alternatively, the control unit 44 may read each Non-IP data based on a delimiter or a separator inserted before and after each Non-IP data.

Figure 11:
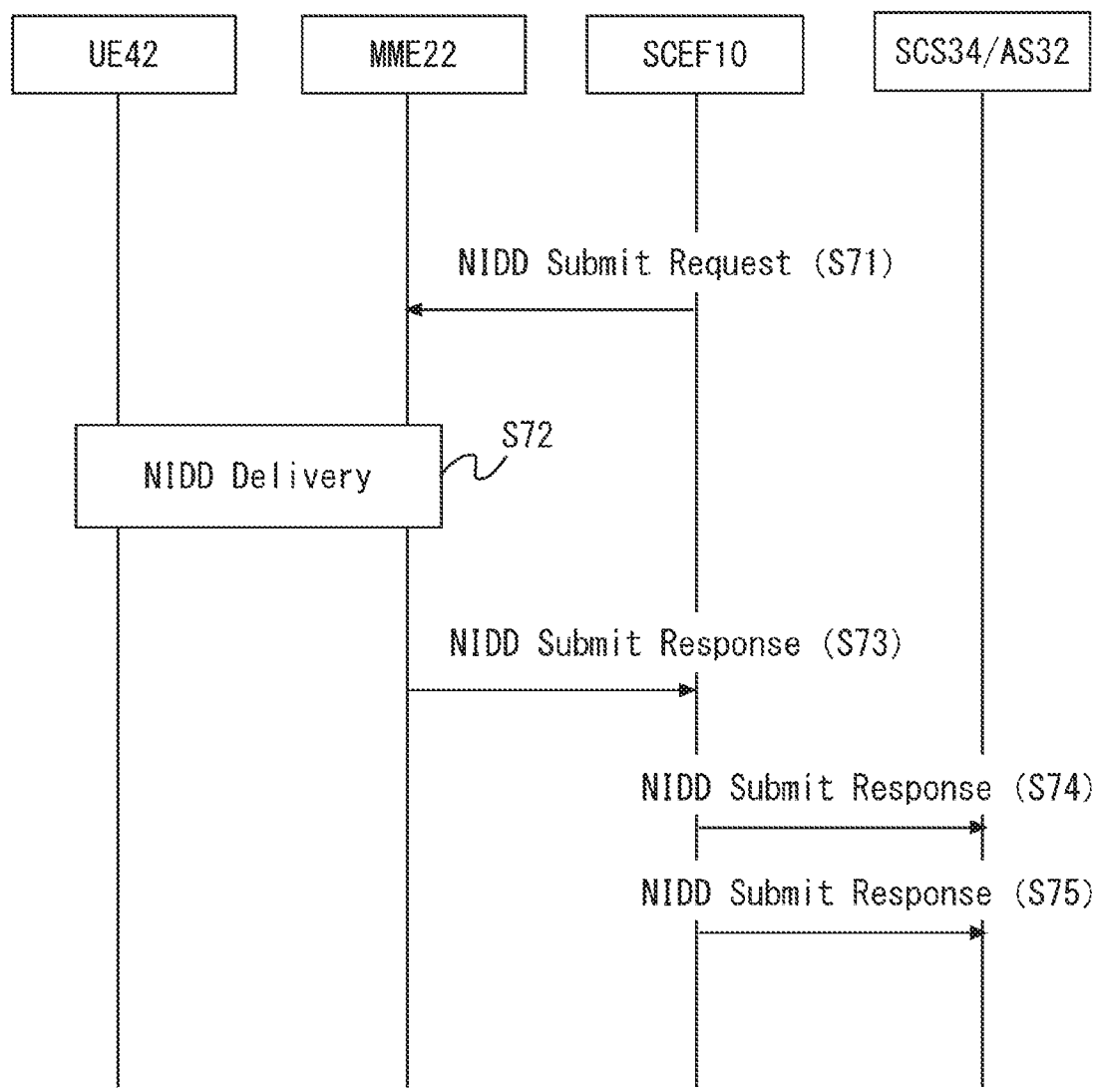
FIG. 11 is a view showing the flow of a process when a UE is reachable according to the fifth embodiment.

The flow of a process when the UE 42 is reachable is described hereinafter with reference to FIG. 11. FIG. 11 shows a process subsequent to processing that the SCEF 10 sends the buffered Non-IP data to the MME 22 after a notification indicating that the UE 42 is reachable is given to the SCEF 10.

First, the SCEF 10 receives an a notification that the UE 42 is reachable from the MME 22, and then sends a plurality of buffered Non-IP data to the SCEF EPS bearer of the UE 42 towards the MME 22 by using one NIDD Submit Request message (S71). For example, the SCEF 10 may set initially buffered Non-IP data to a data area close to the beginning of the NIDD Submit Request message and set newly buffered Non-IP data to a data area close to the end of this message.

The MME 22 receives the NIDD Submit Request message containing a plurality of Non-IP data, and then delivers the plurality of Non-IP data to the UE 42 by using one message (S72).

Then, when Non-IP data delivery in Step S44 is initiated successfully, the MME 22 sends an NIDD Submit Response message to the SCEF 10 (S73). The SCEF 10 then sends the NIDD Submit Response message to the SCS 34/AS 32 for each Non-IP data (S74 and S75). For example, it is assumed that, in Step S43, the SCEF 10 sends Non-IP data #1 buffered initially and Non-IP data #2 buffered after that to the MME 22 by using one NIDD Submit Request message. In this case, the SCEF 10 receives the NIDD Submit Response message, and then sends an NIDD Submit Response message indicating delivery of Non-IP data #1 to the UE 42 in Step S74, and sends an NIDD Submit Response message indicating delivery of Non-IP data #2 to the UE 42 in Step S75.

As described above, by performing the process shown in FIG. 11, the SCEF 10 can send a plurality of Non-IP data to the MME 22 by using one NIDD Submit Request message. Further, the MME 22 can deliver a plurality of Non-IP data to the UE 42 by using one message. Furthermore, the UE 42 can read a plurality of Non-IP data contained in one message for each Non-IP data.

This reduces the number of messages sent in a mobile network and thereby prevents congestion that can occur in the mobile network. For example, in the case where an IoT terminal is used as the UE 42, a significantly large number of IoT terminals are expected to be connected to a mobile network. Therefore, it is possible to obtain greater effects of reducing the number of messages when an IoT terminal is used as the UE 42, for example.

Configuration examples of the UE 42 and the SCEF 10 described in the above-described plurality of embodiments are described hereinafter.

Figure 12:
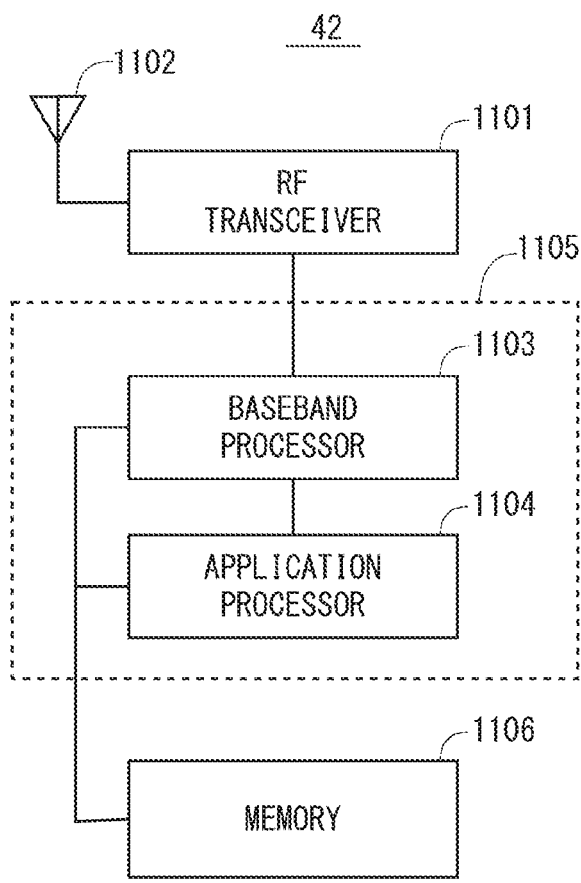
FIG. 12 is a block diagram of a UE according to each embodiment.

FIG. 12 is a block diagram showing a configuration example of the UE 42. A Radio Frequency (RF) transceiver 1101 performs analog RF signal processing for communication with the RAN 26. The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulated symbol data (or OFDM symbol data) from the baseband processor 1103, generates a transmission RF signal and supplies the transmission RF signal to the antenna 1102. Further, the RF transceiver 1101 generates a baseband received signal based on a received RF signal received by the antenna 1102 and supplies it to the baseband processor 1103.

The baseband processor 1103 performs digital baseband signal processing (data plane processing) and control plane processing for radio communication. The digital baseband signal processing includes (a) data compression/decompression, (b) data segmentation/concatenation, (c) transmission format (transmission frame) composition/decomposition, (d) transmission path encoding/decoding, (e) modulation (symbol mapping)/demodulation, and (f) OFDM symbol data (baseband OFDM signal) generation by Inverse Fast Fourier Transform (IFFT) and the like. On the other hand, the control plane processing includes communication management of Layer 1 (e.g., transmission power control), Layer 2 (e.g., radio resource management and hybrid automatic repeat request (HARQ) processing), and Layer 3 (e.g., attach, mobility, and signaling related to call management).

For example, in the case of LTE and LTE-Advanced, the digital baseband signal processing by the baseband processor 1103 may include signal processing of Packet Data Convergence Protocol (PDCP) layer, Radio Link Control (RLC) layer, MAC layer, and PHY layer. Further, the control plane processing by the baseband processor 1103 may include processing of Non-Access Stratum (NAS) protocol, RRC protocol, and MAC CE.

The baseband processor 1103 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 1104, which is described below.

The application processor 1104 is also called a CPU, an MPU, a microprocessor or a processor core. The application processor 1104 may include a plurality of processors (a plurality of processor cores). The application processor 1104 implements each function of the UE 42 by running a system software program (Operating System (OS)) and various application programs (e.g., call application, web browser, mailer, camera control application, music playback application etc.) read from a memory 1106 or a memory, which is not shown.

In some implementations, as shown in the dotted line (1105) in FIG. 12, the baseband processor 1103 and the application processor 1104 may be integrated into one chip. In other words, the baseband processor 1103 and the application processor 1104 may be implemented as one System on Chip (SoC) device 1105. The SoC device is also called a system Large Scale Integration (LSI) or a chip set in some cases.

The memory 1106 is a volatile memory, a nonvolatile memory, or a combination of them. The memory 1106 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. For example, the memory 1106 may include an external memory device that is accessible from the baseband processor 1103, the application processor 1104 and the SoC 1105. The memory 1106 may include an internal memory device that is integrated into the baseband processor 1103, the application processor 1104 or the SoC 1105. Further, the memory 1106 may include a memory in a Universal Integrated Circuit Card (UICC).

The memory 1106 may store a software module (computer program) containing a group of instructions and data for performing the processing by the UE 42 described in the above plurality of embodiments. In several implementations, the baseband processor 1103 or the application processor 1104 may be configured to perform the processing of the UE 42 described in the above embodiments by reading the software module from the memory 1106 and executing it.

Figure 13:
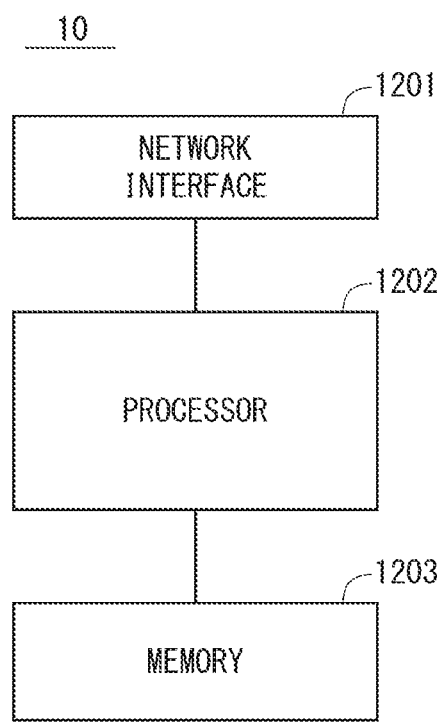
FIG. 13 is a block diagram of an SCEF according to each embodiment.

FIG. 13 is a block diagram showing a configuration example of the SCEF 10. Referring to FIG. 13, the SCEF 10 includes a network interface 1201, a processor 1202, and a memory 1203. The network interface 1201 is used to communicate with network nodes (e.g., the MME 22 or the SGSN 24). The network interface 1201 may include a network interface card (NIC) that complies with the IEEE 802.3 series, for example.

The processor 1202 reads and runs software (computer program) from the memory 1203 and thereby executes processing of the SCEF 10 that is described with reference to the sequence charts and the flowcharts in the embodiments described above. The processor 1202 may be a microprocessor, an MPU or a CPU, for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 13, the memory 1203 is used to store a group of software modules. The processor 1202 reads and runs the group of software modules from the memory 1203 and can thereby perform the processing of the SCEF 10 described in the above embodiments.

As described with reference to FIGS. 12 and 13, each of processors included in the UE 42 and the SCEF 10 in the above embodiments runs one or a plurality of programs including a group of instructions for causing a computer to perform the algorithms described using the drawings. This program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described embodiments and may be varied in many ways within the scope of the present invention. Further, in this disclosure, embodiments can be combined as appropriate.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

Further, the whole or part of the embodiments disclosed above can be described as, but not limited to, the following supplementary notes.

Supplementary Note 1

An SCEF (Service Capability Exposure Function) entity comprising:

a storage unit configured to buffer Non-IP data not delivered to a communication terminal through a control node; and a control unit configured to, upon receiving a control message sent from the control node in response to a communication event that has occurred in the communication terminal, send the Non-IP data buffered in the storage unit to the control node without waiting for transmission of an indication message from the control node, the indication message explicitly indicating that the Non-IP data is deliverable to the communication terminal.

Supplementary Note 2

The SCEF entity according to Claim 1, wherein, when identification information of a communication terminal set in the control message and identification information of a communication terminal that is a destination of the Non-IP data buffered in the storage unit match, the control unit sends the Non-IP data buffered in the storage unit to the control node without waiting for transmission of the indication message from the control node.

Supplementary Note 3

The SCEF entity according to Claim 1 or 2, wherein the communication event is sending a message requesting transmission of Non-IP data to the control node by the communication terminal.

Supplementary Note 4

The SCEF entity according to Claim 3, wherein, upon receiving an NIDD (Non-IP data Delivery) Submit Request message from the control node, the control unit sends the Non-IP data buffered in the storage unit to the control node without waiting for transmission of an NIDD Submit Indication message from the control node.

Supplementary Note 5

The SCEF entity according to Claim 1 or 2, wherein the communication event is performing TAU (Tracking Area Update) involving change of the control node by the communication terminal.

Supplementary Note 6

The SCEF entity according to Claim 5, wherein, upon receiving an Update Serving Node Information message from the control node, the control unit sends the Non-IP data buffered in the storage unit to the control node without waiting for transmission of an NIDD Submit Indication message from the control node.

Supplementary Note 7

The SCEF entity according to any one of Claims 1 to 6, wherein the control unit sends the Non-IP data buffered in the storage unit to the control node sequentially in order of buffering into the storage unit.

Supplementary Note 8

The SCEF entity according to any one of Claims 1 to 7, wherein the control unit sends one message containing a plurality of Non-IP data buffered in the storage unit to the control node.

Supplementary Note 9

The SCEF entity according to any one of Claims 1 to 8, wherein the control unit sends the Non-IP data buffered in the storage unit to the control node so as to satisfy traffic or load allowed for a server device that has sent the Non-IP data.

Supplementary Note 10

The SCEF entity according to any one of Claims 1 to 8, wherein the control unit sends the Non-IP data buffered in the storage unit to the control node so as to satisfy traffic or load allowed for the communication terminal.

Supplementary Note 11

The SCEF entity according to Claim 10, wherein the control unit receives information related to traffic or load allowed for the communication terminal from a subscriber information management device placed in a mobile network.

Supplementary Note 12

The SCEF entity according to any one of Claims 1 to 8, wherein the control unit sends the Non-IP data buffered in the storage unit to the control node so as to satisfy traffic or load allowed for the SCEF entity.

Supplementary Note 13

A control node comprising:
a communication unit configured to notify an SCEF entity of failure in delivering Non-IP data to a communication terminal; and
a control unit configured to detect a communication event that has occurred in the communication terminal,
wherein, when there is a control message to be sent to the SCEF entity in response to the communication event, the communication unit sends the control message to the SCEF entity without sending, to the SCEF entity, an indication message explicitly indicating that the Non-IP data is deliverable to the communication terminal.

Supplementary Note 14

The control node according to Claim 13, wherein, when identification information of the communication terminal associated with the Non-IP data and identification information of the communication terminal associated with the communication event match, the communication unit sends the control message to the SCEF entity without sending the indication message to the SCEF entity.

Supplementary Note 15

The control node according to Claim 14, wherein, when an SCEF entity being a destination of the control message and an SCEF entity to which failure in delivering the Non-IP data is notified match, the communication unit sends the control message to the SCEF entity without sending the indication message to the SCEF entity.

Supplementary Note 16

The control node according to any one of Claims 13 to 15, wherein the communication event is requesting transmission of Non-IP data by the communication terminal.

Supplementary Note 17

The control node according to Claim 16, wherein, when the communication terminal requests transmission of the Non-IP data, the communication unit sends an NIDD Submit Request message to the SCEF entity without sending an NIDD
Submit Indication message to the SCEF entity.

Supplementary Note 18

The control node according to any one of Claims 13 to 15, wherein the communication event is performing TAU (Tracking Area Update) involving change of the control node by the communication terminal.

Supplementary Note 19

The control node according to Claim 18, wherein, when the communication terminal performs TAU involving change of the control node, the communication unit sends an Update Serving Node Information message to the SCEF entity without sending an NIDD Submit Indication message to the SCEF entity.

Supplementary Note 20

A communication method comprising:
buffering Non-IP data not delivered to a communication terminal through a control node; and
upon receiving a control message sent from the control node in response to a communication event that has occurred in the communication terminal, sending the buffered Non-IP data to the control node without waiting for transmission of an indication message from the control node, the indication message explicitly indicating that the Non-IP data is deliverable to the communication terminal.

Supplementary Note 21

A communication method comprising:
notifying an SCEF entity of failure in delivering Non-IP data to a communication terminal; and
detecting a communication event that has occurred in the communication terminal,
wherein, when there is a control message to be sent to the SCEF entity in response to the communication event, the control message is sent to the SCEF entity without sending, to the SCEF entity, an indication message explicitly indicating that the Non-IP data is deliverable to the communication terminal.

Supplementary Note 22

A non-transitory computer readable medium storing a program causing a computer to execute:
buffering Non-IP data not delivered to a communication terminal through a control node; and
upon receiving a control message sent from the control node in response to a communication event that has occurred in the communication terminal, sending the buffered Non-IP data to the control node without waiting for transmission of an indication message from the control node, the indication message explicitly indicating that the Non-IP data is deliverable to the communication terminal.

Supplementary Note 23

A non-transitory computer readable medium storing a program causing a computer to execute:
notifying an SCEF entity of failure in delivering Non-IP data to a communication terminal; and
detecting a communication event that has occurred in the communication terminal,
wherein, when there is a control message to be sent to the SCEF entity in response to the communication event, the control message is sent to the SCEF entity without sending, to the SCEF entity, an indication message explicitly indicating that the Non-IP data is deliverable to the communication terminal.

REFERENCE SIGNS LIST

10 SCEF
11 STORAGE UNIT
12 CONTROL UNIT
20 CONTROL NODE
22 MME
24 SGSN
26 RAN
28 COMMUNICATION UNIT
29 CONTROL UNIT
30 SERVER DEVICE
32 AS
34 SCS
40 COMMUNICATION TERMINAL
42 UE
43 COMMUNICATION UNIT
44 CONTROL UNIT
50 MME

The invention claimed is:
1. A system comprising:
a control node; and
an exposure function entity between the control node and an Application Server; wherein
if the control node has received a NAS (Non Access Stratum) message with non-IP data from a terminal and has sent a Request message for NIDD (Non-IP Data Delivery) including the non-IP data to the exposure function entity during Mobile Originated procedure for NIDD,
the control node is configured to:
clear a Not Reachable for NIDD flag for the terminal, and
skip sending an Indication message for NIDD to the exposure function entity, and
the exposure function entity is configured to:
send a Request message for NIDD including downlink non-IP data buffered in the exposure function entity toward the control node if the exposure function entity has not received the Indication message for NIDD from the control node.
2. A control node comprising a processor configured to process to:
clear a Not Reachable for NIDD (Non-IP Data Delivery) flag for a terminal and skip sending an Indication message for NIDD to an exposure function entity between the control node and an Application Server, if the control node has received a NAS (Non Access Stratum) message with non-IP data from the terminal and has sent a Request message for NIDD including the non-IP data to the exposure function entity during Mobile Originated procedure for NIDD.

3. An exposure function entity, between a control node and an Application Server, comprising a processor configured to process to:
send a Request message for NIDD (Non-IP Data Delivery) including downlink non-IP data buffered in the exposure function entity toward the control node if the exposure function entity has not received an Indication message for NIDD from the control node and if the exposure function entity has received a Request message for NIDD from the control node during Mobile Originated procedure for NIDD.

4. A method comprising:
clearing a Not Reachable for NIDD (Non-IP Data Delivery) flag for a terminal and skipping sending an Indication message for NIDD to an exposure function entity, if having received a NAS (Non Access Stratum) message with non-IP data from the terminal and having sent a Request message for NIDD including the non-IP data to the exposure function entity during Mobile Originated procedure for NIDD.

5. A method comprising:
sending a Request message for NIDD (Non-IP Data Delivery) including already buffered downlink non-IP data toward a control node if having not received an Indication message for NIDD from the control node and if having received a Request message for NIDD from the control node during Mobile Originated procedure for NIDD.

6. The system according to claim 1, wherein
the control node is MME (Mobility Management Entity) or SGSN (Serving GPRS (General Packet Radio Service) Support Node); and
the exposure function entity is SCEF (Service Capability Exposure Function) entity.

7. The control node according to claim 2, wherein
the control node is MME (Mobility Management Entity) or SGSN (Serving GPRS (General Packet Radio Service) Support Node); and
the exposure function entity is SCEF (Service Capability Exposure Function) entity.

8. The exposure function entity according to claim 3, wherein
the control node is MME (Mobility Management Entity) or SGSN (Serving GPRS (General Packet Radio Service) Support Node); and
the exposure function entity is SCEF (Service Capability Exposure Function) entity.

9. The method according to claim 4, wherein
the exposure function entity is SCEF (Service Capability Exposure Function) entity.

10. The method according to claim 5, wherein
the control node is MME (Mobility Management Entity) or SGSN (Serving GPRS (General Packet Radio Service) Support Node).

* * * * *